(12) United States Patent
Wang

(10) Patent No.: US 10,560,951 B2
(45) Date of Patent: Feb. 11, 2020

(54) MITIGATION OF ADJACENT CHANNEL INTERFERENCE IN COMMUNICATION SATELLITES

(71) Applicant: LOCKHEED MARTIN CORPORATION, Besthesda, MD (US)

(72) Inventor: Li Leah Wang, Fremont, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 9 days.

(21) Appl. No.: 16/001,861

(22) Filed: Jun. 6, 2018

(65) Prior Publication Data

US 2018/0368150 A1    Dec. 20, 2018

Related U.S. Application Data

(60) Provisional application No. 62/519,771, filed on Jun. 14, 2017.

(51) Int. Cl.

| | |
|---|---|
| *H04W 72/08* | (2009.01) |
| *H04W 72/04* | (2009.01) |
| *H04B 7/185* | (2006.01) |
| *H04W 64/00* | (2009.01) |
| *H04W 48/12* | (2009.01) |
| *H04B 7/06* | (2006.01) |

(52) U.S. Cl.
CPC ...... *H04W 72/082* (2013.01); *H04B 7/18513* (2013.01); *H04B 7/18547* (2013.01); *H04W 48/12* (2013.01); *H04W 64/003* (2013.01); *H04W 72/042* (2013.01); *H04W 72/048* (2013.01); *H04W 72/0453* (2013.01); *H04B 7/0617* (2013.01)

(58) Field of Classification Search
None
See application file for complete search history.

(56) References Cited

U.S. PATENT DOCUMENTS

| | | | |
|---|---|---|---|
| 2012/0046003 A1* | 2/2012 | Ying | H04B 1/406 455/90.2 |
| 2013/0244570 A1* | 9/2013 | Park | H04B 7/18539 455/12.1 |
| 2014/0112302 A1* | 4/2014 | Bacquet | H04W 72/0406 370/330 |
| 2015/0188644 A1* | 7/2015 | Kang | H04B 15/00 455/12.1 |

(Continued)

*Primary Examiner* — Hong S Cho
(74) *Attorney, Agent, or Firm* — Morgan, Lewis & Bockius LLP (57) ABSTRACT

A method for carrier frequency assignment to users includes receiving, by a service provider scheduler, a service request from a user. The method further includes receiving, by the service provider scheduler, satellite beams information of a satellite. A user location corresponding to the user is determined. A service beam to service the user and a distance from a center of the service beam to the user location are determined based on the satellite beams information. The service beam is a satellite beam of a plurality of satellite beams provided by the satellite, and the satellite is in communication with the user via the service beam. Carrier frequency assignment to users is made to mitigate adjacent channel interference.

18 Claims, 8 Drawing Sheets

(56) References Cited

U.S. PATENT DOCUMENTS

| | | | |
|---|---|---|---|
| 2016/0072613 A1* | 3/2016 | Esserman | H04L 5/0037 370/230 |
| 2017/0005741 A1* | 1/2017 | Wu | H04B 17/364 |
| 2017/0180038 A1* | 6/2017 | Oza | H04B 7/18513 |
| 2017/0339710 A1* | 11/2017 | Johnson | H04B 7/2041 |
| 2017/0346564 A1* | 11/2017 | Wiswell | H04B 10/118 |
| 2018/0006710 A1* | 1/2018 | Buer | H04B 7/18519 |

* cited by examiner

MITIGATION OF ADJACENT CHANNEL INTERFERENCE IN COMMUNICATION SATELLITES

CROSS-REFERENCE TO RELATED APPLICATIONS

This application claims the benefit of priority under 35 U.S.C. § 119 from U.S. Provisional Patent Application 62/519,771 filed Jun. 14, 2017, which is incorporated herein by reference in its entirety.

STATEMENT REGARDING FEDERALLY SPONSORED RESEARCH OR DEVELOPMENT

Not applicable

FIELD OF THE INVENTION

The present invention generally relates to satellite communication, and more particularly to a mitigation method for adjacent channel interference in communication satellites.

BACKGROUND

Adjacent channel interference (ACI) is one of the major impairments that can reduce achievable capacity in a satellite, especially in a high capacity throughput satellite (HTS) with densely packed spot beams. Adjacent channel interference arises due to leakages in channel filters used in satellite repeaters. Because most filters are finite response filters, adjacent channel interference can always be present. The most common technique to suppress ACI is to design multi-pole Butterworth filters with exceedingly steep roll-offs and thus quite low leakages. However, the steeper the filter is, the higher its insertion loss, and the more costly the filter can get.

The current ground system for communication satellites assigns carriers to users randomly from a total bandwidth pool, independent of a location of the requesting users. In order to mitigate ACI impairment, satellite operators often impose very stringent ACI specifications to the spacecraft manufacturers, for example, about 30 dB or higher over the temperature range and life of the satellite. Spacecraft manufacturers have to deal with fabricating and implementing very difficult filters in order to meet the ACI specification, which can naturally drive up the cost and delay the schedule.

SUMMARY

According to various aspects of the subject technology, methods and configurations are disclosed to suppress adjacent channel interference (ACI) without the need for steep channel filters. The disclosed solution allows maximum bandwidth usage without ACI impairment. The method of the subject technology applies to a high throughput satellite (HTS) with densely populated spot beams. Each beam can service thousands of users, where each user can use its share of carriers per demand from the total beam bandwidth. The bandwidth or carrier distribution to users is performed by ground systems.

In one or more aspects, a system for carrier frequency assignment to users includes a memory to store instructions, and a processor to execute the instructions. The instructions include receiving a service request from a user and satellite beams information of a satellite from a gateway. The instructions further include determining a geographical location associated with the user based on user information stored in the memory, and determining a service beam to service the user and a distance from a center of the service beam to the geographical location based on the satellite beams information. The service beam is a satellite beam covering the geographical location associated with the user.

In other aspects, a service provider includes a scheduler in communication with a satellite gateway and a user. The scheduler can receive a service request from the user and satellite beams information of a satellite from the satellite gateway. The scheduler can further determine a geographical location associated with the user based on user information stored by the service provider, and a service beam to service the user. The scheduler further determines a distance from a center of the service beam to the geographical location associated with the user based on the satellite beams information. The service beam is a satellite beam covering the geographical location associated with the user.

The foregoing has outlined rather broadly the features of the present disclosure so that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

According to some aspects of the subject technology, methods and configurations are disclosed for suppressing adjacent channel interference (ACI) without the need for steep channel filters. The disclosed method allows maximum bandwidth usage without ACI impairment. In one or more aspects, the subject solution applies to a high throughput satellite (HTS) with densely populated spot beams. Each satellite beam can service thousands of users, and each user can use, on demand, a share of carriers from the total beam bandwidth. The bandwidth or carrier distribution to users is the responsibility of a ground operation control system.

Conventionally, the ground system can randomly assign carriers from available bandwidth to users requesting service. According to the disclosed solution, the carrier assignment to users is not random and can depend on the geographic location of the user. The users located near beam centers will be given carriers from the edge of the channel where those carriers or the spectrum can be affected mostly by ACI. The users located at the outer edge of the beam can be given carriers from the center of the channel where ACI is virtually non-existent.

Figure 1:
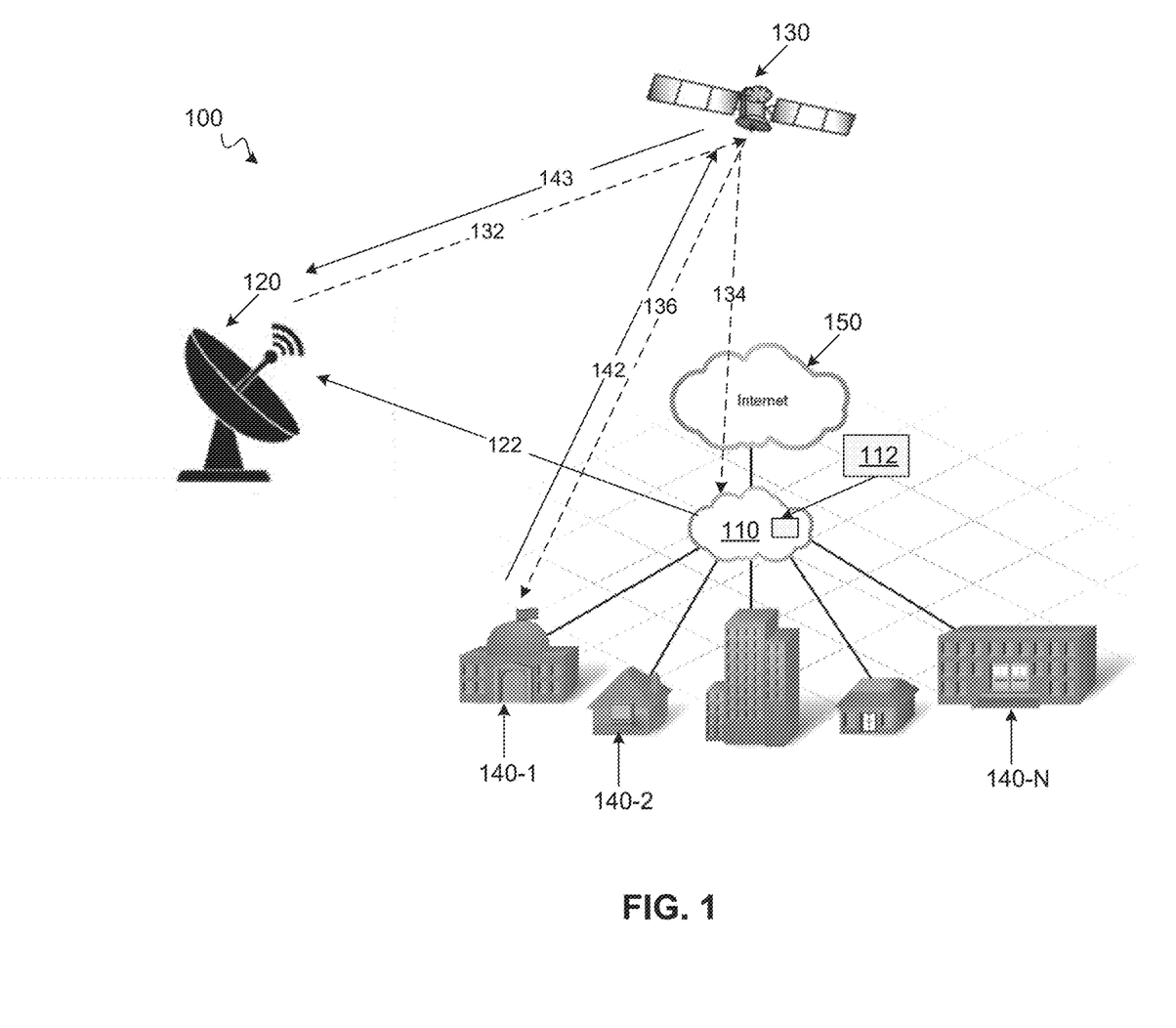
FIG. 1 is a high-level block diagram illustrating an example environment in which the subject technology is implemented.

FIG. 1 is a high-level block diagram illustrating an example environment 100 in which the subject technology is implemented. The environment 100 includes a service provider 110, a satellite gateway 120, a communication satellite 130 (hereinafter "satellite 130"), and a number of users 140 (e.g., 140-1, 140-2 . . . 140-N). In one or more implementations, the service provider 110 may be a satellite service provider and in communication with the satellite 130 via the satellite gateway 120 through a ground network link 122 and a satellite forward link 132. The service provider 110 is also connected to the network 150 (e.g., the Internet). The satellite 130 can send information directly to the service provider 110 and/or the user 140, via satellite forward links 134 and 136, respectively. The user 140 can send signals to the satellite gateway 120 via the satellite 130 through satellite return links 142 and 143. The satellite 130 includes one or more repeaters (not shown for simplicity) that can receive signals from the ground and retransmit signals to the ground. The repeater is an electronic device and may include one or more receivers including, for example, amplifier and filter circuits (e.g., channel filters) and one or more transmitters including, for instance, channel filters and power amplifiers.

In one or more implementations, the service provider 110 may include a scheduler 112 in communication with the satellite gateway 120 and one or more of the users 140 (e.g., 140-2). The scheduler 112 can receive a service request from the user 140-2 and satellite beams information of the satellite 130 from the satellite gateway 120. The scheduler 112 can determine a geographical location associated with the user 140-2 (hereinafter "user location") based on user information stored by the service provider 110. The scheduler 112 can further determine a service beam to service the user 140-2. The scheduler 112 can further determine a distance from a center of the service beam to the user location based on the satellite beams information. The service beam is a satellite beam that can cover the user location.

Figure 2A:
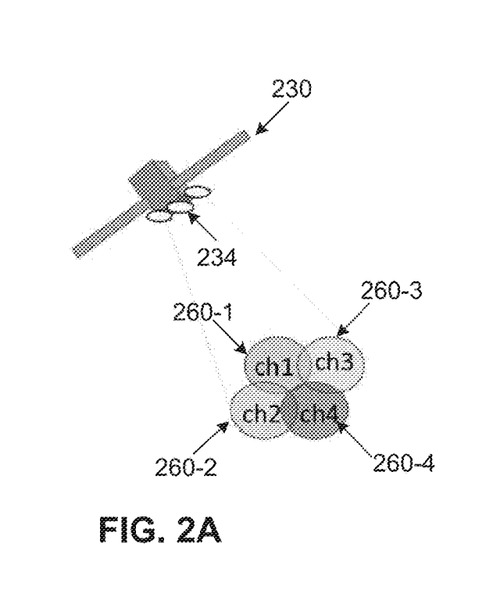
FIGS. 2A through 2C are schematic diagrams illustrating example communication satellite beams and corresponding adjacent channel interference (ACI).
Figure 2B:
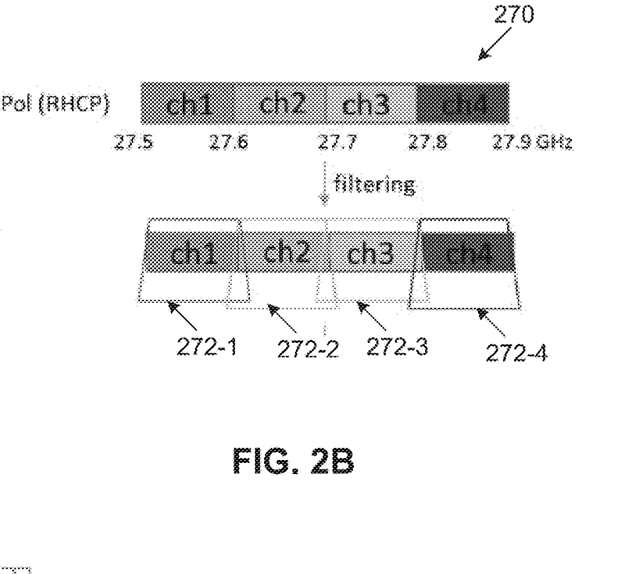
Figure 2C:
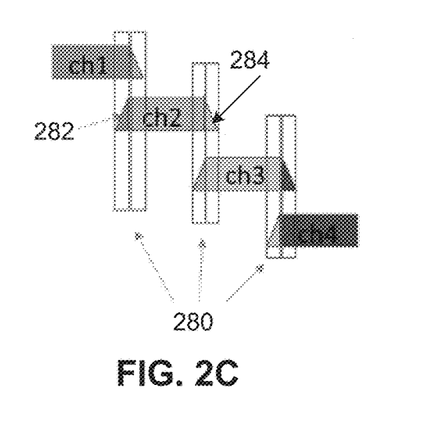

FIGS. 2A through 2C are schematic diagrams illustrating example communication satellite beams, corresponding channels, and adjacent channel interference (ACI). The satellite 230 shown in FIG. 2A is similar to the satellite 130 of FIG. 1 and includes satellite antennas 234. The satellite antennas 234 can communicate with the ground via a number of (e.g., four) beams 260. Each beam may cover users in a predefined geographical area on the ground. The communication through each beam can take place in a frequency range identified by a frequency channel (hereinafter "channel"). For example, the four channels corresponding to beams 260 (e.g., 260-1 through 260-4) are channel 1 (ch1) through channel 4 (ch4). In a forward link as an example, all channels come from the gateway 120 of FIG. 1, where those channels are mapped next to each other to minimize spectrum usage. The gateway 120 uplink is then routed through the repeater of the satellite 130 of FIG. 1 before each channel is downlinked to each beam 260.

FIG. 2B shows a frequency spectrum associated with ch1, ch2, ch3 and ch4 of beams 260. For example, ch1 covers a frequency range of 27.5-27.6 GHZ with a channel width of 100 MHz. Channels ch2, ch3, and ch4 may have the same channel width (e.g., 100 MHz) and cover adjacent frequency ranges 27.6-27.7, 27.7-27.8, and 27.8-27.9 GHz. In order to separate these channels, the satellite repeater may use channel filters 272 (e.g., 272-1, 272-2, 272-3, and 272-4). The repeater may also frequency convert and amplify the channel signals. In one or more implementations, there is multistage filtering to separate channels as well as to filter out spurious contents from passing through various active payload equipment. To maximize the useful bandwidth per channel, the filter passband needs to be as wide as possible. The channel filters 272 are band-pass filters (BPF) with suitable pass bands corresponding to the frequency ranges of the respective channels (e.g., ch1, ch2, ch3, and ch4). The filters 272 are generally finite response filters, where the filter response is not ideal (e.g., with sharp role-off) and can be approximated with a trapezoid shape with a roll-off slope on each side. Because of the finite slope of the filter roll-off, as shown in FIG. 2B, each channel carries parasitic spectra from adjacent channels.

FIG. 2C shows the parasitic spectra as sources of ACI in channels of the beam 260. These parasitic spectra can cause the ACI because any beam, not only receives its intended channel, but also the parasitic interfering channel 280 from its neighbors at the exact same frequency. For example, the beam 260-2 is supposed to receive channel 2 only, but it also receives a first parasitic (interference) component 282 from channel 1 carried by the beam 260-1 and a second parasitic (interference) component 284 from channel 3 carried by the beam 260-3. The interference components 282 and 284 can lead to multiple path interference or ACI in channel 1 edge of beam 260-1 and channel 3 edge in beam 260-3. It is the spectrum near channel edges that is mostly affected by ACI where filter roll-off is smallest. Those edge spectrums impacted by ACI are marked by rectangular boxes for illustration purposes. By making the filters steeper, the parasitic spectrum can become narrower and thus help to alleviate the problem, but steeper filters are costly and very lossy as mentioned above. The most common technique to suppress ACI is to design multi-pole Butterworth filters with very steep roll-offs and thus very low leakages (e.g., parasitic components). However, the steeper the filter is, the higher its insertion loss will be, and the more expensive it will become. The disclosed solution addresses a simple and low cost solution to suppress ACI without the need for steep channel filters. The subject method allows maximum bandwidth usage without ACI impairment.

Figure 3:
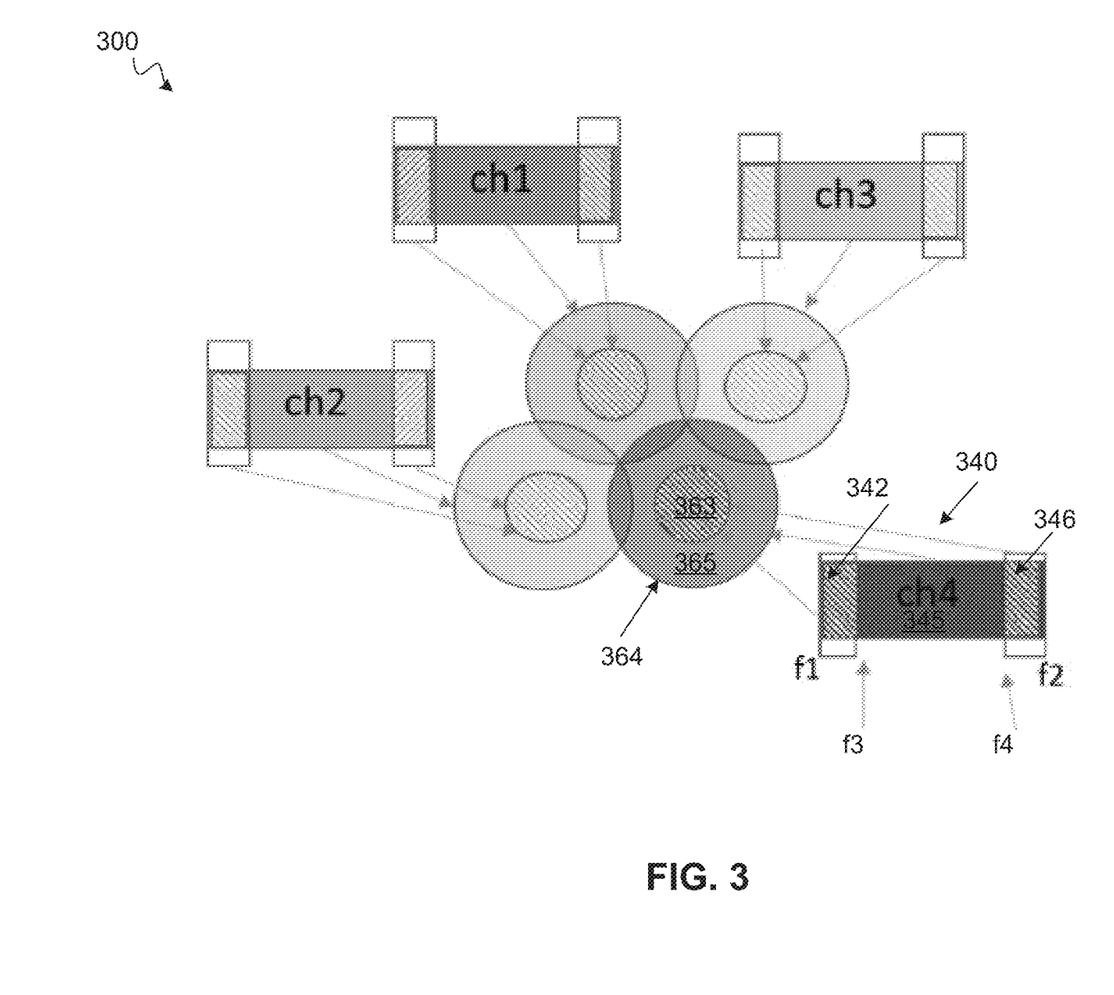
FIG. 3 is a conceptual diagram illustrating an example carrier assignment method to users based on users' geographical location within a beam, according to certain aspects of the disclosure.

FIG. 3 is a conceptual diagram illustrating an example carrier assignment method 300 to users based on users' geographical location within a beam, according to certain aspects of the disclosure. The carrier assignment method 300 applies to an HTS satellite with densely populated spot beams. Each beam (e.g., 260-1 of FIG. 2A) can service thousands of users, where each user will get its share of carriers per demand from the total beam bandwidth. The bandwidth or carrier distribution to users is done by ground systems (e.g., the service provider 110 of FIG. 1). Conventionally, the ground system randomly assigns carriers from available bandwidth to users requesting service. In the subject technology, the carrier assignment to users is not random, but depends on the user location within the beam coverage. The users located near the center region of a beam can be assigned carriers from the edge of the channel where those carriers or spectrum are affected most by ACI. The users located at the outer edge of the beam will be given carriers from the center of the channel where ACI is virtually non-existent, as described herein.

FIG. 3 illustrates the proposed carrier assignment method 300 to users based on users' geographical location within a beam (e.g., 364). By doing so, the ACI impacted carriers will be physically located farthest from their interferers, which are parasitic channels carried by adjacent neighboring beams. The total ACI suppression at the carrier location is the total carrier power in dBm minus the total interferer power in dBm at the same bandwidth. The total ACI suppression can be expressed as:

$$ACI_{total} = P_{carrier\_repeater} - P_{interferer\_repeater} + G_{antenna\_carrier} - G_{antenna\_interferer} = ACI_{repeater} + \Delta_{antenna\_gain};$$ (Eq. 1)

Where $\Delta_{antenna\_gain}$ is the difference in antenna gain at the carrier location between the carrier user beam and its neighboring beams, and $ACI_{repeater}$ is the ACI suppression from the repeater, which is the net filter rejection ratio.

Near the beam center region 363 of the beam 364, the carrier antenna gain is the largest, and the interferer antenna gain from a neighbor beam is much weaker due to farther distance from neighboring beam center. Therefore, the intended carrier power is amplified significantly more as compared to the interferer. This results in effectively enhancing the ACI suppression by the antenna gain difference.

The subject solution assigns users in the center region (e.g., 363) of the beam (e.g., 364) the carrier frequencies in the edge regions 342 and 346 of a corresponding channel spectrum 340. The users located in an edge region (e.g., 365) of a beam (e.g., 364) are assigned the carrier frequencies in a central region 345 of the corresponding channel spectrum 340. The edge regions 342 and 346 of the channel spectrum 340 can be defined by frequencies ($f_1$, $f_3$ and $f_4$, $f_2$), as shown in FIG. 3. The frequencies $f_1$ and $f_2$ are the edge frequencies of the channel spectrum 340 and the frequencies $f_3$ and $f_4$ are given in equations Eq. 2 and Eq. 3 below:

$$f_3 = f_1 + (f_2 - f_1) * alpha$$ (Eq. 2)

$$f_4 = f_1 + (f_2 - f_1) * alpha$$ (Eq. 3)

Where, alpha is determined based on a roll-off factor of a channel filter of the repeater of the satellite 130 of FIG. 1.

Figure 4:
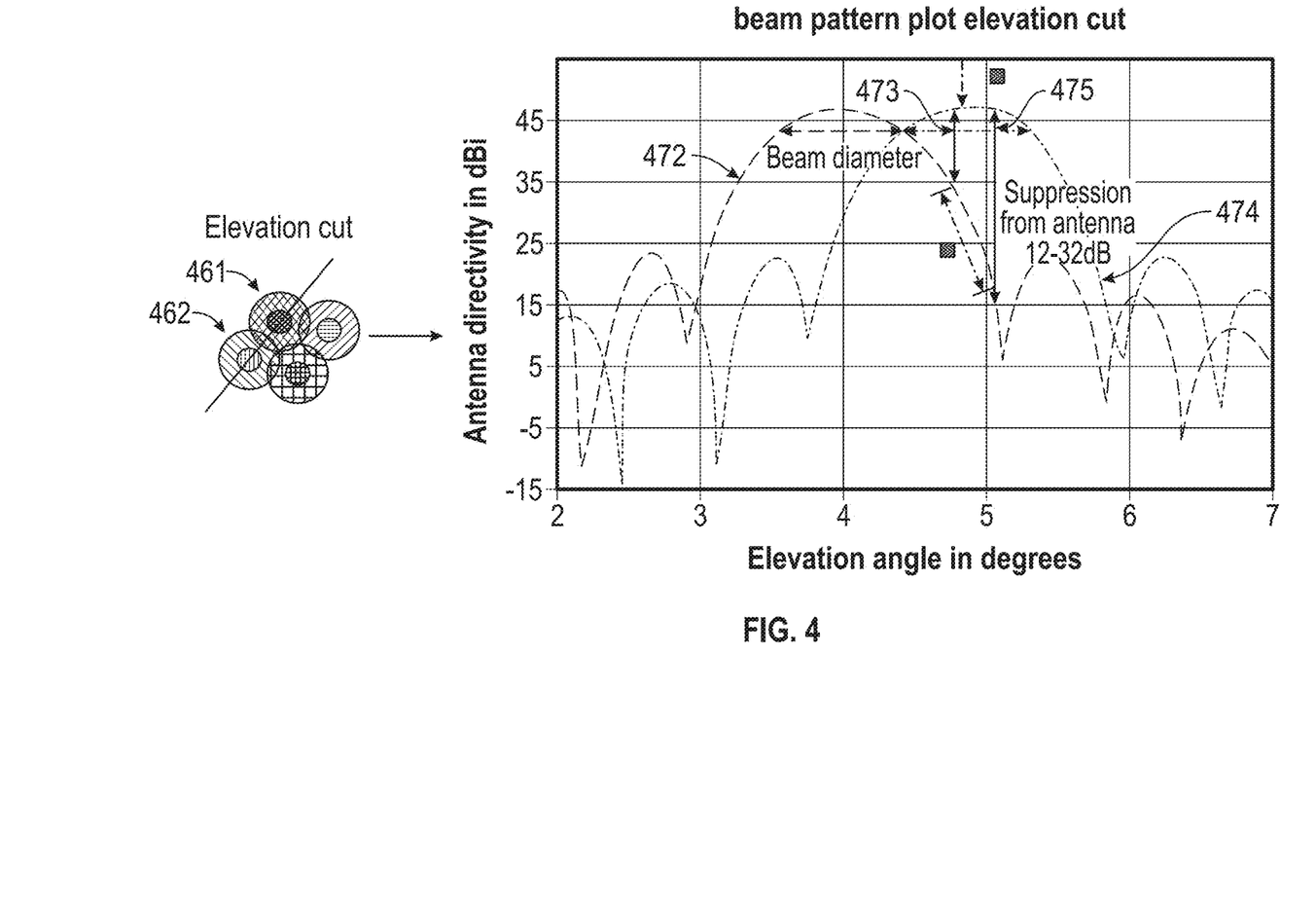
FIG. 4 is a chart illustrating an example antenna pattern plot (elevation cut) for two neighboring beams, according to certain aspects of the disclosure.

FIG. 4 is a chart illustrating an example antenna pattern plot (elevation cut) for two neighboring beams, according to certain aspects of the disclosure. The antenna elevation pattern plots 472 and 474 shown in FIG. 4 are for two adjacent beams 462 and 461, respectively. Each of the beams 461 and 462 is about 0.9 degrees in diameter and the spacing between the two beam centers is about 1.56 degrees. For this illustration, beam 462 carries interferers and beam 461 carries the carrier signals. As shown in FIG. 4, the carrier gain at the beam center of plot 474 is significantly higher than the interferer gain at the same location from the beam pattern 472. The delta in gain (475) changes from 12 dB to 32 dB when moving from ½ radius to the beam center, shown by two arrows 473 and 475, respectively. This delta in gain provides additional ACI suppression beyond that from the repeater. It is worth noting that the antenna gain difference gradually diminishes near the beam edge as shown in the plot 474; therefore, conventional approach of assigning carriers randomly to users will not be able to take advantage of antenna gain based ACI suppression effect.

The ACI suppression enhancement achieved by this method can dramatically reduce the ACI suppression requirement at the repeater. A typical less-steep filter with rejection ratio of 15 dB can translate to total ACI suppression ratio of about 27-47 dB by adding the antenna gain enhancement, which is more than sufficient to eliminate the ACI impairment completely. Those less-steep filters can have lower insertion loss and will be at lower cost, which can lead to simpler, better performance, and lower cost repeaters. The proposed carrier distribution method can be easily implemented into the current ground systems by very minor software modification. No new equipment development is needed.

Figure 5:
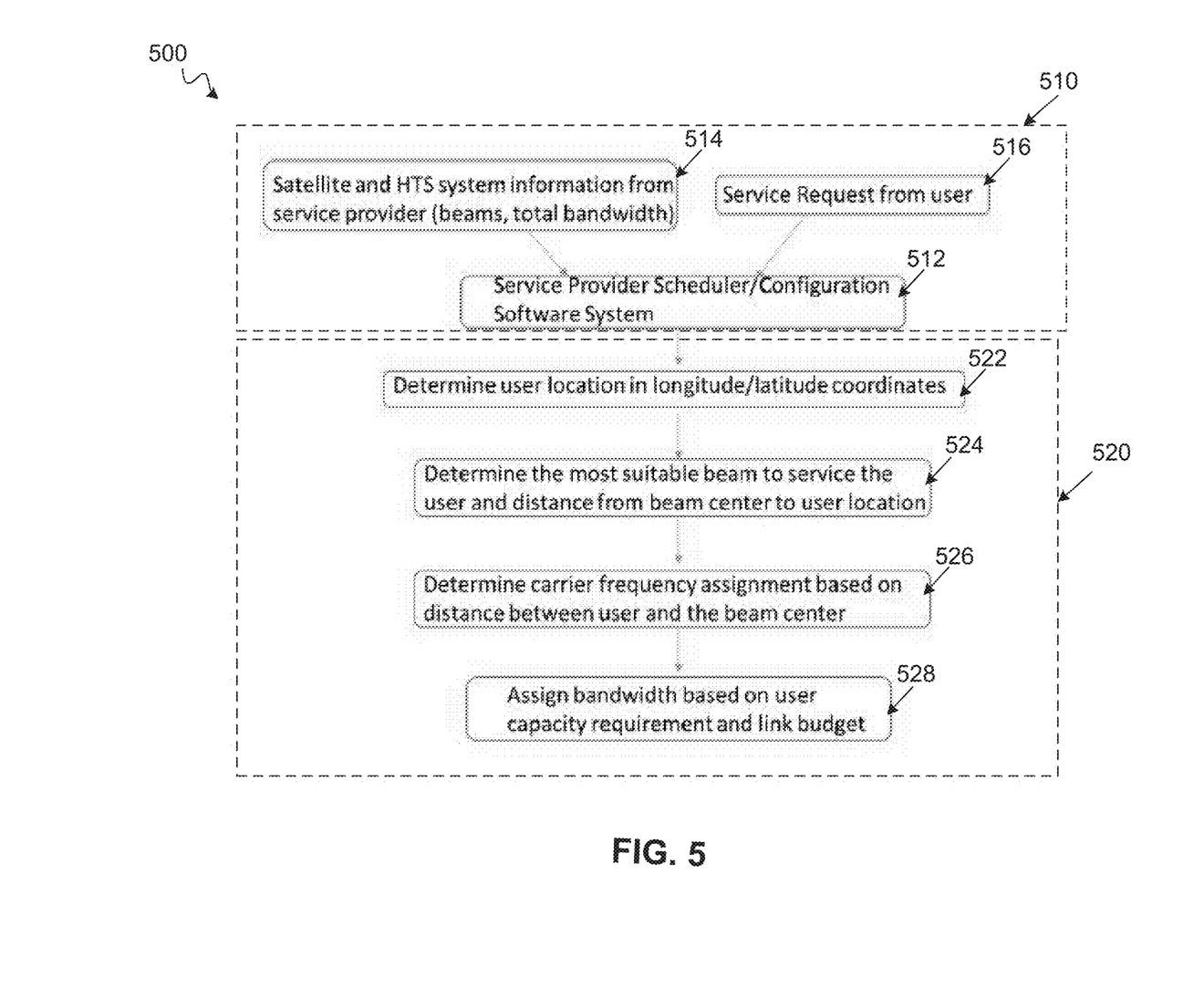
FIG. 5 is a flow diagram illustrating an example implementation process of the subject technology, according to certain aspects of the disclosure.

FIG. 5 is a flow diagram illustrating an example implementation process 500 of the subject technology, according to certain aspects of the disclosure. The example implementation process 500 includes a section 510 and a section 520. The section 510 indicates inputs to a service provider scheduler and/or configuration software system 512 (hereinafter "scheduler 512"). The scheduler 512 is similar to the scheduler 112 of FIG. 1 and receives satellite and HTS system information 514 from the service provider (e.g., 110 of FIG. 1) and a service request 516 from a user (e.g., 142-2 of FIG. 1). The scheduler 512 can perform the functionalities listed in section 520. For example, the scheduler 512 can determine a user location in terms of longitude/latitude coordinates (522). The scheduler 512 can further determine the most suitable beam to serve the user and a distance from the beam center to the user location (524). A carrier frequency assignment can be performed, by the scheduler 512, based on the distance from the beam center to the user location (526). The scheduler 512 can further assign a bandwidth to the user based on a user capacity and link budget (528).

Figure 6:
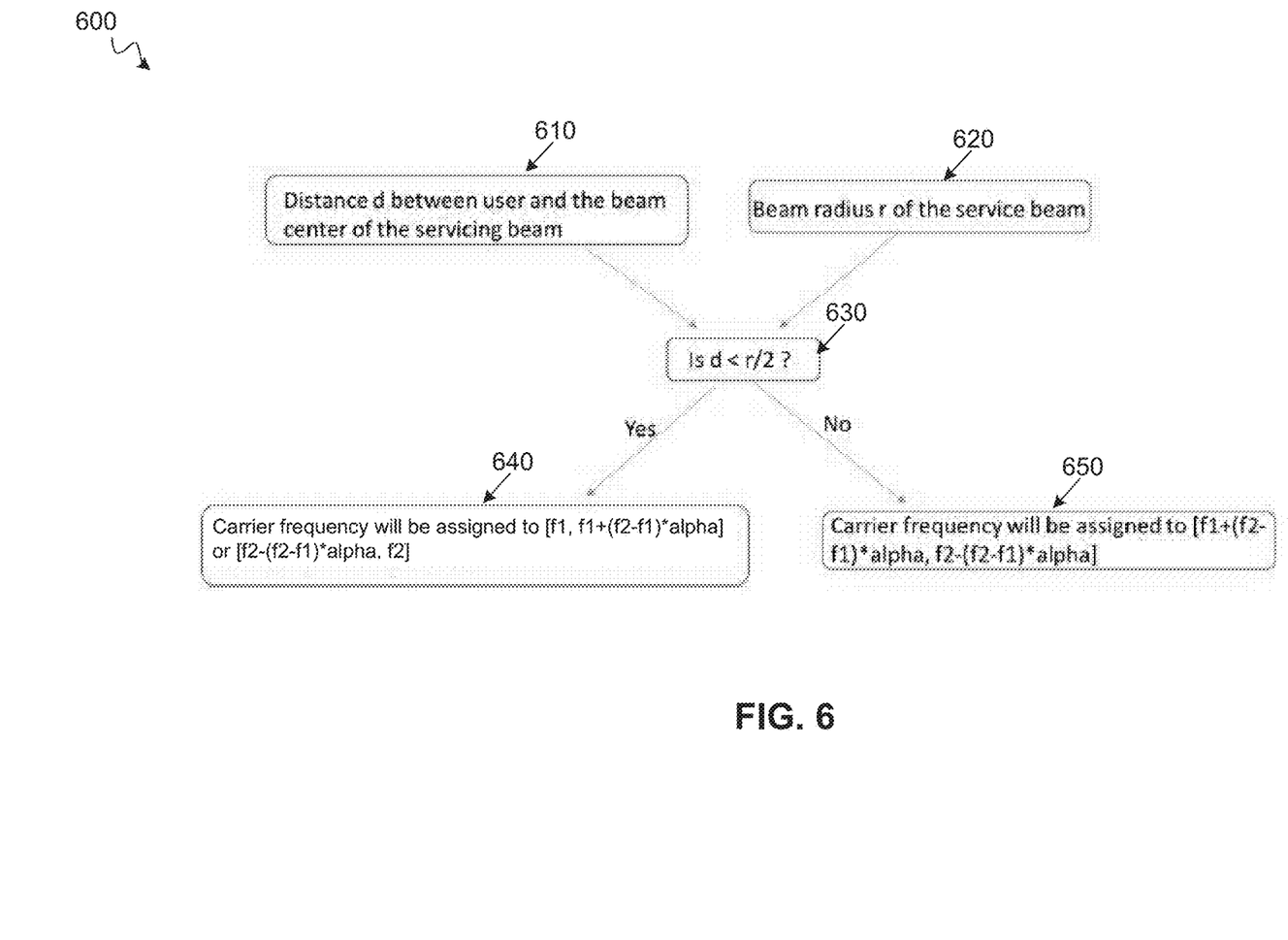
FIG. 6 is a flow diagram illustrating an example process for carrier assignment and/or distribution, according to certain aspects of the disclosure.

FIG. 6 is a flow diagram illustrating an example process 600 for carrier assignment and/or distribution, according to certain aspects of the disclosure. According to the example process 600, the scheduler (e.g., 112 of FIG. 1), at operation block 610, determines a distance d from the beam center of the servicing beam to the user location. The scheduler further determines, at operation block 620, a beam radius (r) of the servicing beam based on the received satellite and HTS system information 514 of FIG. 5. The scheduler then compares d with r/2 at control operation 630. If d is smaller than r/2, at operation block 640, the schedule assigns a first carrier frequency, within a range defined by [$f_1$, $f_1$+($f_2$-$f_1$)*alpha] or by [$f_2$-($f_2$-$f_1$)*alpha, $f_2$], to the user. Otherwise, if d is not smaller than r/2, at operation block 650, the schedule assigns a second carrier frequency, within a range defined by [$f_1$+($f_2$-$f_1$)*alpha, $f_2$-($f_2$-$f_1$)*alpha], to the user. Where $f_1$ and $f_2$ are the lowest frequency and the highest frequency of the service beam, and alpha is determined based on the roll-off factor of the channel filter of the repeater of the satellite.

Figure 7:
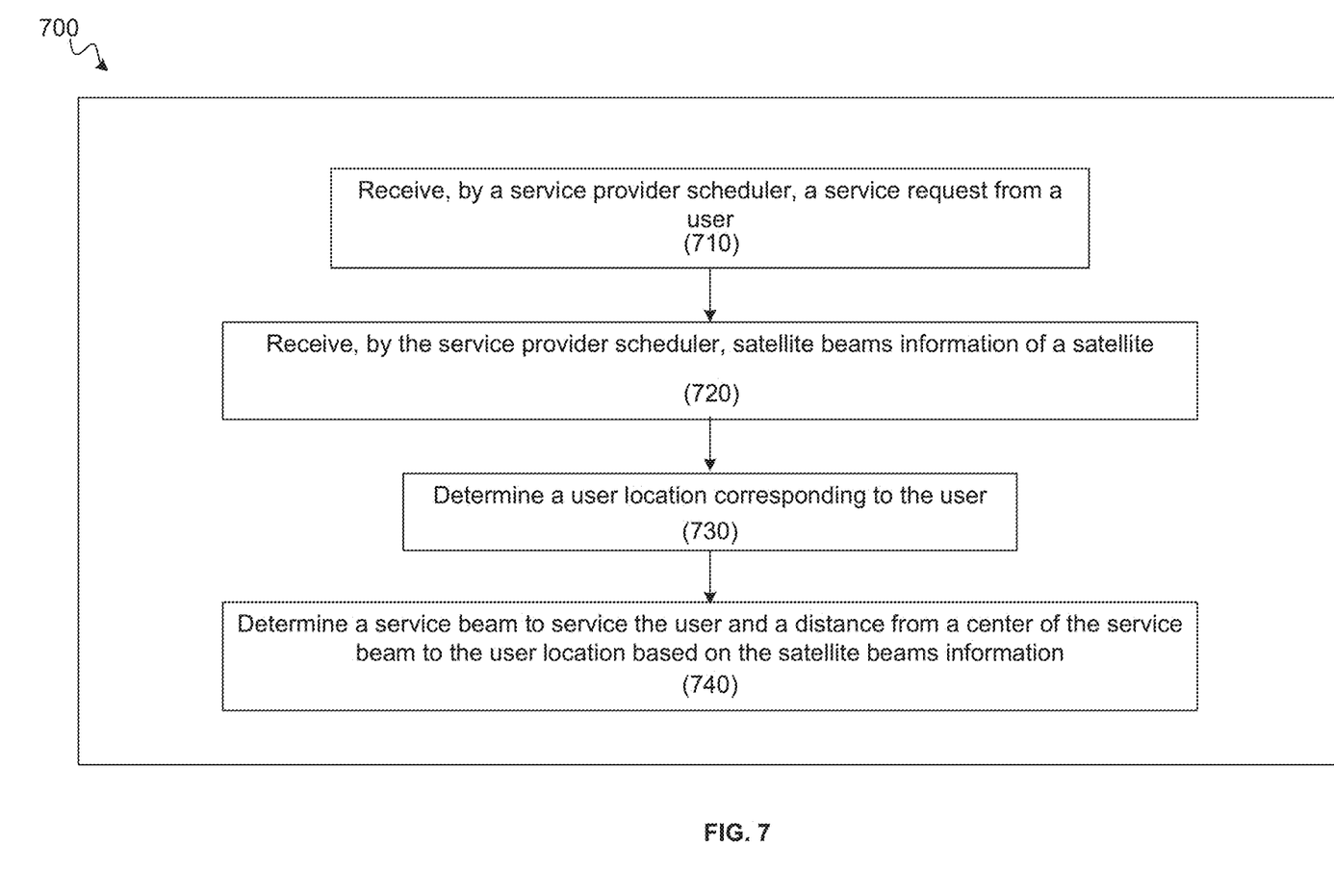
FIG. 7 is a flow diagram illustrating an example method of carrier assignment to users based on geographical location, according to some aspects of the subject technology.

FIG. 7 is a flow diagram illustrating an example method 700 of carrier assignment to users (e.g., 140 of FIG. 1) based on geographical location, according to some aspects of the subject technology. The method 700 includes receiving, by a service provider scheduler (e.g., 112 of FIG. 1), a service request from a user (e.g., 140-2 of FIG. 1) (710). The method further includes receiving, by the service provider scheduler, satellite beams information (e.g., 514 of FIG. 5) of a satellite (e.g., 130 of FIG. 1) (720). A user location corresponding to the user is determined (e.g., by 112 of FIG. 1) (730). A service beam (e.g., 260-1 of FIG. 2A) to service the user and a distance (e.g., d of FIG. 6) from a center of the service beam to the user location are determined based on the satellite beams information (740). The service beam is a satellite beam of a plurality of satellite beams (e.g., 260 of FIG. 2A) provided by the satellite, and the satellite is in communication with the user via the service beam.

Figure 8:
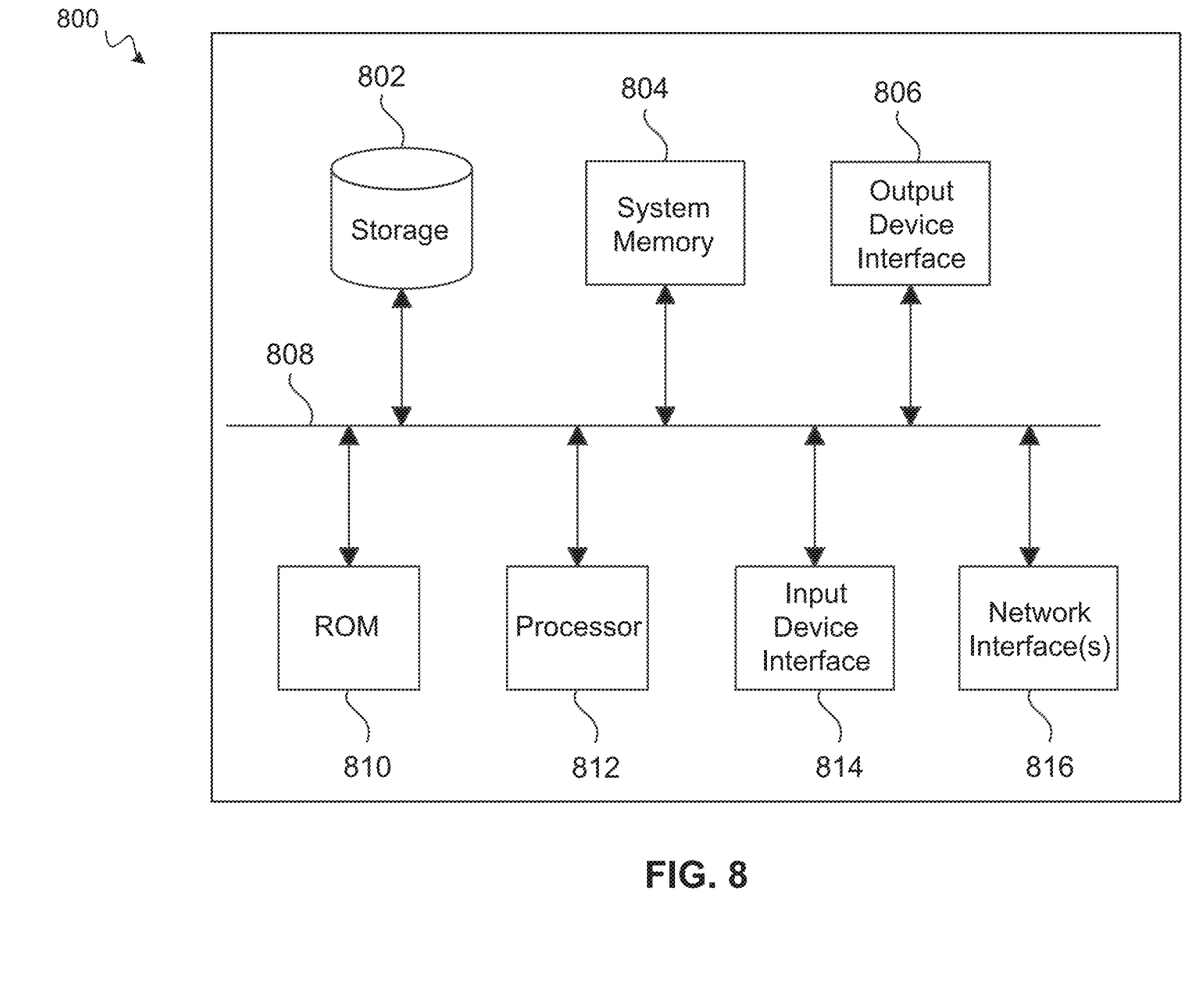
FIG. 8 is a block diagram conceptually illustrating an electronic system with which aspects of the subject technology are implemented.

FIG. 8 is a block diagram conceptually illustrating an electronic system with which aspects of the subject technology are implemented. The electronic system 800 includes a bus 808, one or more processing unit(s) 812, a system memory 804, a read-only memory (ROM) 810, a permanent storage device 802, an input device interface 814, an output device interface 806, and a network interface 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations. In some implementations, the one or more processing unit(s) 812 can perform the functionalities described above for a scheduler 112 of FIG. 1, including one or more processing steps of the flow diagrams of FIGS. 6-7.

The ROM 810 stores static data and instructions that are needed by the one or more processing unit(s) 812 and other modules of the electronic system. The permanent storage device 802, on the other hand, is a read-and-write memory device. The permanent storage device 802 is a non-volatile memory unit that stores instructions and data even when the electronic system 800 is off. One or more implementations of the subject disclosure use a mass-storage device (such as a magnetic or optical disk and its corresponding disk drive) as the permanent storage device 802.

Other implementations use a removable storage device (such as a floppy disk, flash drive, and its corresponding disk drive) as the permanent storage device 802. Like the permanent storage device 802, the system memory 804 is a read-and-write memory device. However, unlike the permanent storage device 802, the system memory 804 is a volatile read-and-write memory, such as a random access memory. System memory 804 stores any of the instructions and data that the one or more processing unit(s) 812 needs at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input device interface 814 and the output device interface 806. The input device interface 814 enables a user to communicate information and select commands to the electronic system. Input devices used with the input device interface 814 include, for example, alphanumeric keyboards and pointing devices (also called "cursor control devices"). The output device interface 806 enables, for example, the display of images generated by the electronic system 800. Output devices used with the output device interface 806 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks (not shown) through one or more network interfaces 816. In this manner, the computer can be a part of one or more network of computers (such as a local area network ("LAN"), a wide area network ("WAN"), or an Intranet, or a network of networks, such as the Internet). Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A method for carrier frequency assignment to users, the method comprising:
   receiving, by a service provider scheduler, a service request from a user;
   receiving, by the service provider scheduler, satellite beams information of a satellite;
   determining a user location corresponding to the user; and
   determining a service beam to service the user based on service beam information and a distance from a center of the service beam to the user location based on the satellite beams information;
   wherein:
      the service beam information comprises a total bandwidth, a lowest frequency $f_1$ and a highest frequency $f_2$ of the service beam, and a beam radius of the service beam,
      the service beam comprises a satellite beam of a plurality of satellite beams provided by the satellite, and
      the satellite is in communication with the user via the service beam.

2. The method of claim 1, further comprising assigning a bandwidth to the user based on a user capacity requirement and a user link budget.

3. The method of claim 1, wherein the satellite comprises a communication satellite, and wherein the communication satellite comprises a high throughput satellite (HTS) with a capacity higher than about 10 Gbits/s.

4. The method of claim 1, wherein the user location comprises a longitude and latitude coordinate.

5. The method of claim 1, wherein the distance from the center of the service beam to the user location is less than a half of the service beam radius, and the method further comprises assigning a first carrier frequency to the user, wherein the assigned first carrier frequency is within a range defined by $[f_1, f_1+(f_2-f_1)*alpha]$ or by $[f_2-(f_2-f_1)*alpha, f_2]$, wherein alpha is determined based on a roll-off factor of a channel filter of a repeater of the satellite.

6. The method of claim 1, wherein the distance from the center of the service beam to the user location is more than or equal to a half of the service beam radius, and the method further comprises assigning a second carrier frequency to the user.

7. The method of claim 6, wherein the assigned second carrier frequency is within a range defined by $[f_1+(f_2-f_1)*alpha, f_2-(f_2-f_1)*alpha]$, wherein alpha is determined based on a roll-off factor of a channel filter of a repeater of the satellite.

8. The method of claim 7, wherein the service request comprises a requested capacity, and wherein the method further comprises determining a bandwidth by dividing the requested capacity by a link spectral efficiency.

9. The method of claim 8, further comprising determining the link spectral efficiency based on a user link budget and a number of other factors including a carrier noise ratio (CNR), interference level, free space losses, and atmospheric losses; and assigning the determined bandwidth to the user.

10. A system for carrier frequency assignment to users, the system comprising:
 a memory configured to store instructions; and
 a processor configured to execute the instructions, the instructions comprising:
  receiving a service request from a user;
  receiving satellite beams information of a satellite from a gateway;
  determining a geographical location associated with the user based on user information stored in the memory;
  determining a link spectral efficiency based on a user link budget, a carrier noise ratio (CNR), an interference level, free space losses, and atmospheric losses; and
  determining a service beam to service the user based on service beam information and a distance from a center of the service beam to the geographical location associated with the user based on the satellite beams information,
 wherein:
  the service beam comprises a satellite beam covering the geographical location associated with the user.

11. The system of claim 10, the instructions further comprise assigning a bandwidth to the user based on a user requested capacity and the link spectral efficiency.

12. The system of claim 10, the geographical location associated with the user is specified as longitude and latitude coordinates, and wherein determining the service beam to service the user is based on the geographical location associated with the user and the service beam information.

13. The system of claim 10, wherein the service beam information comprises information related to the service beam including a total bandwidth, a lowest frequency $f_1$ and a highest frequency $f_2$ of the service beam, and a beam radius of the service beam.

14. The system of claim 13, wherein the distance from the center of the service beam to the user location is less than a half of a service beam radius, and the instructions further comprises assigning a first carrier frequency to the user, wherein the assigned first carrier frequency is within a range defined by $[f_1, f_1+(f_2-f_1)*alpha]$ or by $[f_2-(f_2-f_1)*alpha, f_2]$, wherein alpha is determined based on a roll-off factor of a channel filter of a repeater of the satellite.

15. The system of claim 13, wherein the distance from the center of the service beam to the geographical location associated with the user is more than or equal to a half of a service beam radius, and the instructions comprises assigning a second carrier frequency to the user, wherein the assigned second carrier frequency is within a range defined by $[f_1+(f_2-f_1)*alpha, f_2-(f_2-f_1)*alpha]$, wherein alpha is determined based on a roll-off factor of a channel filter of a repeater of the satellite.

16. The system of claim 10, wherein the service request comprises a requested capacity, and wherein the instructions further comprise determining a bandwidth by dividing the requested capacity by a link spectral efficiency that is partially dependent upon a user link budget.

17. A service provider comprising:
 a scheduler in communication with a satellite gateway and a user, the scheduler configured to:
  receive a service request from the user and satellite beams information of a satellite from the satellite gateway, the service request comprising a requested capacity;
  determine a geographical location associated with the user based on user information stored by the service provider; and
  determine a service beam to service the user;
  determine a distance from a center of the service beam to the geographical location associated with the user based on the satellite beams information; and
  assign a bandwidth to the user by dividing the requested capacity by a link spectral efficiency that is partially dependent upon a user link budget,
 wherein:
  the service beam comprises a satellite beam covering the geographical location associated with the user.

18. The service provider of claim 17, wherein the scheduler is further configured to:
 assign a first or a second carrier frequency to the user based on a distance from a center of the service beam to the geographical location associated with the user.

* * * * *